United States Patent
Tsukamoto

[19]

[11] Patent Number: 6,063,523
[45] Date of Patent: May 16, 2000

[54] BATTERY TAB ATTACHMENT METHOD AND APPARATUS

[75] Inventor: Hisashi Tsukamoto, Saugus, Calif.

[73] Assignee: Quallion, LLC, Santa Clarita, Calif.

[21] Appl. No.: 09/293,450

[22] Filed: Apr. 16, 1999

[51] Int. Cl.[7] .................................................. H01M 4/02
[52] U.S. Cl. ......................... 429/211; 429/161; 429/209
[58] Field of Search .................................. 429/211, 209, 429/218.1, 231.5, 161

[56] References Cited

U.S. PATENT DOCUMENTS

| | | | |
|---|---|---|---|
| 4,895,705 | 1/1990 | Wrighton et al. | 422/68 |
| 5,565,280 | 10/1996 | Difrancesco | 429/34 |
| 5,582,936 | 12/1996 | Mrotek et al. | 429/241 |
| 5,585,206 | 12/1996 | Morris . | |
| 5,773,164 | 6/1998 | Venkatesan et al. | 429/161 |
| 5,834,133 | 11/1998 | Narukawa et al. . | |
| 5,871,858 | 2/1999 | Thomsen et al. | 429/7 |
| 5,871,861 | 2/1999 | Hirokou et al. | 429/149 |

OTHER PUBLICATIONS

U.S. application No. 09/289,071, Tsukamoto, filed Apr. 8, 1999.

*Primary Examiner*—Maria Nuzzolillo
*Assistant Examiner*—Raymond Alejandro
*Attorney, Agent, or Firm*—Abraham N. Seidman

[57] ABSTRACT

The difficulties encountered with attaching tabs to very thin metal layer, e. g., a layer of gold from 0.3 $\mu$m to 50 $\mu$m thick are severe. Typically, in the uses envisioned for the thin metal layer, which is for a compact battery, a plastic sheet such as polyimide underlies the thin metal layer. Polyimide has a relatively low melting point. The thin polyimide substrate melts when resistance welding is used. Ultrasonic welding doesn't work because the sound wave energy is absorbed by the polyimide. This invention solves the attachment problem by using wire bonding to the thin metal sheet and to its tab. The tab attachment for a thin metal layer comprises a thin metal layer, a metal tab, and a wire and the wire is bonded to the thin metal layer and the wire is bonded to the metal tab. The thin metal layer may be gold; the thickness of the gold is between 0.3 $\mu$m and 50.0 $\mu$m.

7 Claims, 2 Drawing Sheets

BATTERY TAB ATTACHMENT METHOD AND APPARATUS

FIELD OF THE INVENTION

This invention relates to attaching tabs onto layered metal battery components for tapping the battery-developed voltage and current.

BACKGROUND OF THE INVENTION

The attachment to battery tabs of a connecting conductor is relatively easy where the tab metal is reasonably thick and it does not contact a layer of low melting point plastic. Resistance welding or laser welding provide comparatively easy solutions. For example, Morris used spot welding for his battery's tabs (U.S. Pat. No. 5,585,206). Narukawa et al. used ordinary laser welding to both connect the tab collector to the casing and to seal the casing. The problem which this invention solves is the attachment of tabs to the conducting metal of the battery, such as in the battery of a co-pending U.S. patent application, Ser. No. 09/289,071. In that battery, the metal conducting layers of the positive and negative electrodes are in the range of 0.3 to 3 $\mu$m and adhere to a thin layer of polyimide which might be about 9 $\mu$m thick. Consequently, extreme care is required, otherwise the polyimide plastic will melt leading to short circuits within the battery, and the conducting metal itself may also be damaged. Therefore, a small controlled amount of external energy must be used to effect the attachment or bonding.

SUMMARY OF THE INVENTION

The difficulties encountered with attaching tabs to very thin metal layer, e. g., a layer of gold from 0.3 $\mu$m to 50 $\mu$m thick are severe. Typically, in the uses envisioned for the thin metal layer, which is for a compact battery, a plastic sheet such as polyimide underlies the thin metal layer. Polyimide has a relatively low melting point. The thin polyimide substrate melts when resistance welding or ordinary laser welding is used. Ultrasonic welding doesn't work because the sound wave energy is absorbed by the polyimide.

This invention solves the attachment problem by using wire bonding to the thin metal sheet and to its tab.

BRIEF DESCRIPTION OF THE DRAWINGS

The above and other features and advantages of the invention will be more apparent from the following detailed description wherein.

DETAILED DESCRIPTION OF THE PREFERRED EMBODIMENT

The following description is of the best mode presently contemplated for carrying out the invention. This description is not to be taken in a limiting sense, but is merely made for the purpose of describing the general principles of the invention. The scope of the invention should be determined with reference to the claims.

Figure 1:
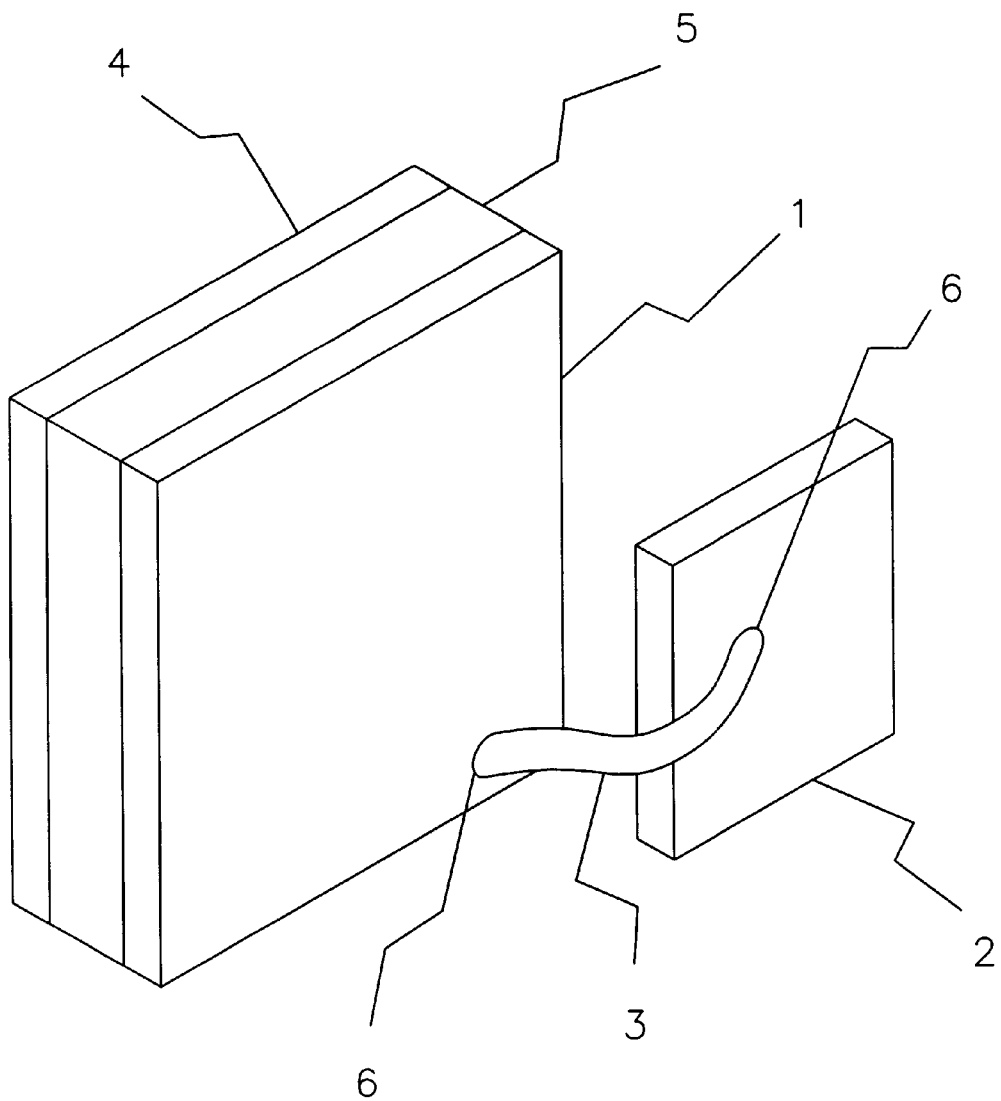
FIG. 1 shows the thin metal layer, the tab, and the wire bonded to each.

This invention solves the attachment problem by using wire bonding to the thin metal sheet and to its tab. FIG. 1 shows the thin metal layer (1), the tab (2), and the wire (3) bonded to each other by wire bonding (6).

The difficulties encountered with attaching tabs (2) to a thin metal layer (1), e. g., a layer of gold from 0.3 $\mu$m to 50 $\mu$m thick are severe. The metal is so thin that resistance welding doesn't work because the metal layer(s) are attached to a layer of relatively low melting point polyimide. It melts the polyimide layer (1) as it heats it up. A similar circumstance occurs when using ordinary laser welding. Ultrasonic welding doesn't work because the sound wave energy is absorbed by the underlying absorbent polyimide.

This invention solves the attachment problem by using wire-bonding (6) to the thin metal layer (1) and to its tab (2). This method for tab attachment for a thin metal layer (1) utilizes the steps of wire bonding (6) one end of a wire (3) to a thin metal layer (1) and wire bonding (6) the other end of the (3) wire to a metal tab (2). The tab attachment for a thin metal layer comprises a thin metal layer (1), a metal tab (2), and a wire (3) and the wire (3) is bonded to the thin metal layer (1) and the wire (3) is bonded (7) to the metal tab (2). The thin metal layer (1) may be gold or aluminum for the positive electrode. For the negative terminal the thin layer may be titanium, iron, stainless steel, or gold.

Figure 2:
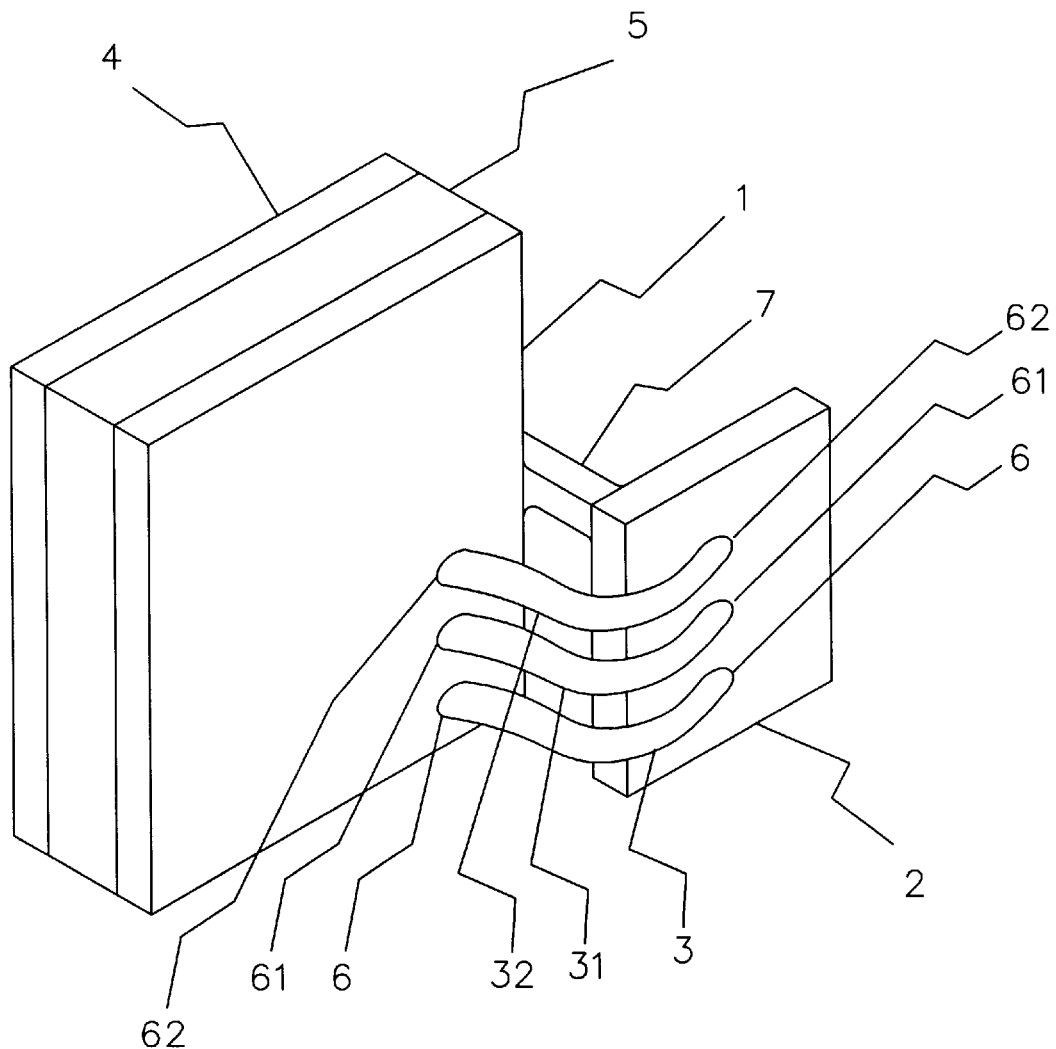
FIG. 2 shows FIG. 1 with additional wires bonded and with mechanical support shown.

FIG. 2 shows everything as in FIG. 1, but also shows additional bonded wires (31, 32) with wire bonding at (61) and (62) and a mechanical bond (7), which may be tape, glue, or adhesive.

While the invention herein disclosed has been described by means of specific embodiments and applications thereof, numerous modifications and variations could be made thereto by those skilled in the art without departing from the scope of the invention set forth in the claims.

What is claimed is:

1. A tab attachment comprising a thin metal layer laminated on a thin plastic layer, a metal tab, and a wire; said wire wire-bonded to said thin metal layer and said wire wire-bonded to said metal tab whereby an electrical connection is established between the metal tab and the thin metal layer; further comprising a mechanical bond between the thin metal layer and the metal tab; wherein said mechanical bond comprises a bond selected from the group consisting of tape, glue and adhesive; further comprising said wire bonds placed toward the ends of the wire, wire-bonded to the thin metal layer and the tab.

2. The tab attachment as in claim 1 wherein a first thin metal layer is selected from the group consisting of gold and aluminum, for a positive electrode; wherein the thickness of the first metal layer is between 0.3 $\mu$m and 50 $\mu$m.

3. The tab attachment as in claim 1 wherein a second thin metal layer is selected from the group consisting of gold, titanium, iron and stainless steel, for a negative electrode; wherein the thickness of the second metal layer is between 0.3 $\mu$m and 50 $\mu$m.

4. The tab attachment as in claim 2 wherein a first metal wire is selected from the group consisting of gold and aluminum, for a positive electrode; wherein the thickness of the first wire is between 10 $\mu$m and 50 $\mu$m.

5. The tab attachment as in claim 3 wherein a second metal wire is selected from the group consisting of gold, titanium, iron and stainless steel, for a negative electrode; wherein the thickness of the second wire is between 10 $\mu$m and 50 $\mu$m.

6. The tab attachment as in claim 2 wherein a first metal tab is selected from the group consisting of gold and aluminum, for a positive electrode; where in the thickness of the first metal tab is between 30 $\mu$m and 80 $\mu$m.

7. The tab attachment as in claim 3 wherein a second metal tab is selected from the group consisting of gold, titanium, iron and stainless steel, for a negative electrode; wherein the thickness of the second metal tab is between 30 $\mu$m and 80 $\mu$m.

* * * * *